(12) United States Patent
Yamaguchi et al.

(10) Patent No.: US 12,393,477 B2
(45) Date of Patent: Aug. 19, 2025

(54) CONTROL DEVICE AND METHOD FOR OPERATING CONTROL DEVICE

(71) Applicants: Kabushiki Kaisha Toshiba, Tokyo (JP); Toshiba Electronic Devices & Storage Corporation, Tokyo (JP)

(72) Inventors: Michitomo Yamaguchi, Kawasaki Kanagawa (JP); Satoshi Kamiya, Kawasaki Kanagawa (JP); Hiroshi Ichikawa, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 131 days.

(21) Appl. No.: 18/241,492

(22) Filed: Sep. 1, 2023

(65) Prior Publication Data
US 2024/0338285 A1   Oct. 10, 2024

(30) Foreign Application Priority Data

Apr. 6, 2023   (JP) ................................ 2023-061896

(51) Int. Cl.
G06F 11/07    (2006.01)
H04L 1/00     (2006.01)
G05B 23/02    (2006.01)

(52) U.S. Cl.
CPC ...... *G06F 11/0736* (2013.01); *G06F 11/0772* (2013.01); *G06F 11/0775* (2013.01); *G06F 11/0796* (2013.01); *H04L 1/0079* (2013.01); *G05B 23/0264* (2013.01); *G05B 23/027* (2013.01)

(58) Field of Classification Search
CPC ......................... G06F 11/0775; G06F 11/0772
See application file for complete search history.

(56) References Cited

U.S. PATENT DOCUMENTS 11,183,999 B2 *  11/2021  Tezuka ............... H03K 17/0828
2020/0174865 A1 *  6/2020  Kim ..................... G06F 11/0793

FOREIGN PATENT DOCUMENTS

| JP | 2013-247821 A | 12/2013 |
| JP | 2020-065341 A | 4/2020 |
| JP | 2020-162370 A | 10/2020 |
| JP | 2021-184677 A | 12/2021 |

\* cited by examiner

*Primary Examiner* — Mark D Featherstone
*Assistant Examiner* — Victor Perry
(74) *Attorney, Agent, or Firm* — Kim & Stewart LLP

(57) ABSTRACT

A control device according to an embodiment includes a first region including a CPU and a sequence signal generation circuit; and a second region including an abnormality detection circuit, a sequence signal detection circuit, a first register storing multiple methods of recovery from occurrence of abnormality, and a second register for use to select one method of recovery from the multiple methods of recovery, the second region being higher in reliability than the first region. The sequence signal generation circuit converts a first signal that specifies the one method of recovery into a sequence signal containing a second signal, which is a digital signal of a predetermined pattern, and the sequence signal detection circuit changes a set value of the second register upon receiving the second signal.

9 Claims, 3 Drawing Sheets

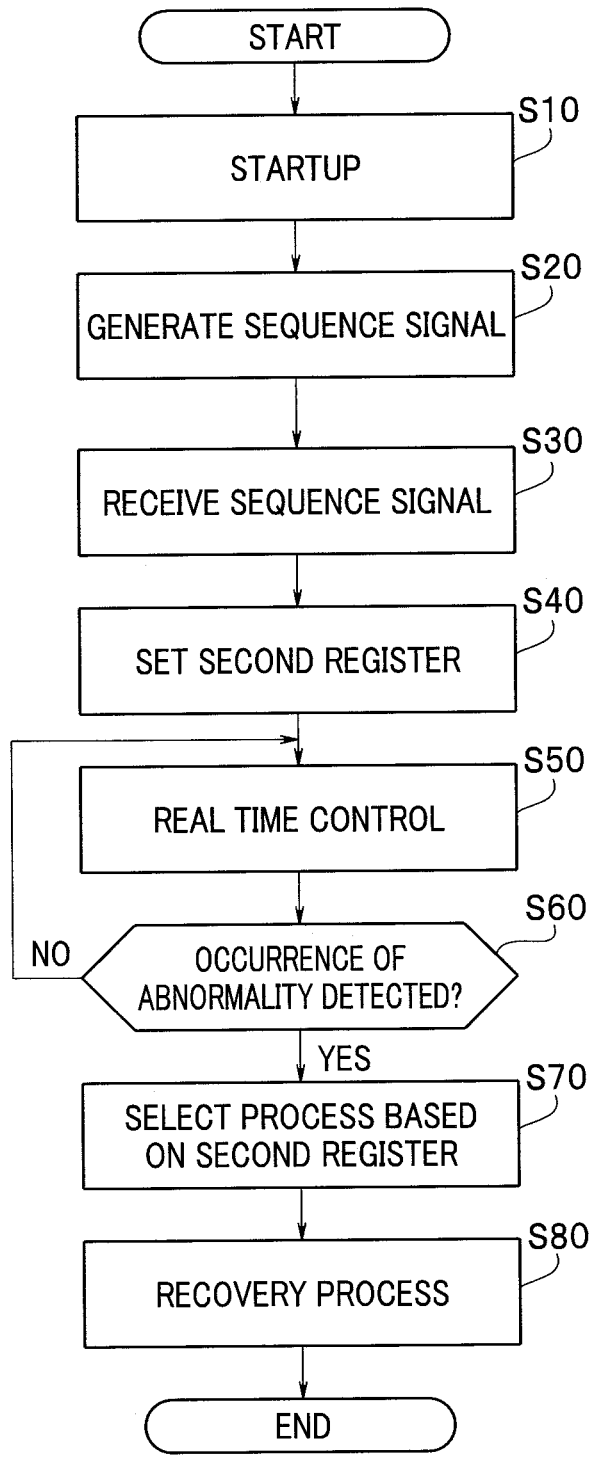

CONTROL DEVICE AND METHOD FOR OPERATING CONTROL DEVICE

CROSS REFERENCE TO RELATED APPLICATION

This application claims the benefit of Japanese Patent Application No. 2023-061896 filed in Japan on Apr. 6, 2023, the contents of which are incorporated herein by this reference.

FIELD

An embodiment described herein relates generally to a control device that includes a first region and a second region higher in reliability than the first region as well as to a method for operating the control device.

BACKGROUND

A control device controls an external member such as a motor in real time and performs control upon detecting occurrence of abnormality to make the control device itself and the external member operate as defined behavior (e.g. transition to a safe condition).

BRIEF DESCRIPTION OF THE DRAWINGS

FIG. 3 is a flowchart of a method for operating the control device according to the embodiment.

DETAILED DESCRIPTION

Figure 1:
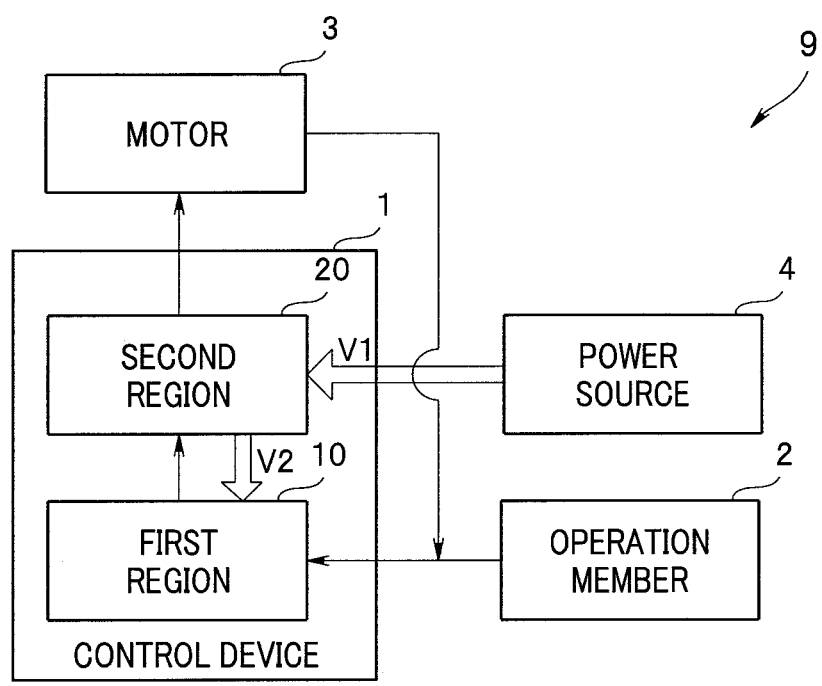
FIG. 1 is a configuration diagram of a drive system including a control device according to an embodiment.

For example, if a control device controlling a motor in real time causes an abnormality known as a stuck failure in which a shorted state or an opened state persists, the motor might get damaged or run out of control.

A power source control unit is known which ensures that a drive system provides fail-safe operation by stopping or otherwise operating on a safe side even if a stuck failure occurs.

It is particularly important to maintain high reliability of transmission paths for reset signals with respect to occurrence of abnormality in case the occurrence of abnormality is detected. For example, the reliability of transmission paths is improved by multiplexing that involves performing a recovery process only when reset signals received via two transmission paths are identical.

However, even if transmission paths are multiplexed, the reliability is not improved when a stuck failure occurs in either a circuit that transmits signals to the transmission paths or a circuit that receives signals from the transmission paths.

A control device that can select one of multiple recovery processes is higher in performance than a control device that can select only a certain fail-safe operation process as a recovery process. However, the control device that can select one of multiple recovery processes cannot perform a recovery process if a memory that stores the multiple recovery processes fails. Besides, if a stuck failure occurs on a transmission path for use to select a recovery process, a wrong recovery process might be performed.

The present embodiment has been devised in view of the above circumstances.

A control device according to the embodiment includes a first region including a CPU and a sequence signal generation circuit; and a second region including an abnormality detection circuit, a sequence signal detection circuit, a first register storing multiple methods of recovery from occurrence of abnormality, and a second register for use to select one method of recovery from the multiple methods of recovery, the second region being higher in reliability than the first region. The sequence signal generation circuit converts a first signal that specifies the one method of recovery into a sequence signal containing a second signal, which is a digital signal of a predetermined pattern, and the sequence signal detection circuit changes a set value of the second register upon receiving the second signal.

A method for operating a control device according to the embodiment wherein: the control device includes a first region, and a second region higher in reliability than the first region; a first register in the second region stores multiple methods of recovery from occurrence of abnormality; a sequence signal generation circuit in the first region converts a first signal that specifies a method of recovery from occurrence of abnormality into a sequence signal containing a second signal, which is a digital signal of a predetermined pattern; and a sequence signal detection circuit in the second region changes a set value of a second register that specifies one method of recovery to be selected from the multiple methods of recovery, upon receiving the second signal.

A control device 1 according to the embodiment will be described in detail below with reference to the accompanying drawings. In the drawings based on the embodiment, illustration and reference signs of some components will be omitted.

As shown in FIG. 1, the control device 1 according to the embodiment makes up a drive system 9 together with an operation member 2, a motor 3, and a power source 4, where the motor 3 is an external member. In other words, the control device 1 according to the embodiment is an MCD (motor control driver) configured to control the motor 3 based on a feedback signal from the motor 3 or an operation signal from the operation member 2.

The control device 1 includes a first region 10 and a second region 20. The first region 10, which is a functional block, has a first drive frequency F1 of 40 MHz. The first region 10 has a first drive voltage V1 of 1.5 V. The second region 20, which is a power source control block configured to receive power from the power source 4, has a second drive frequency F2 of 32 kHz. The second region 20 has a second drive voltage V2 of 5 V.

The second drive frequency F2 of the second region 20 is lower than the first drive frequency F1 of the first region 10, making the second region 20 higher in reliability than the first region 10. Furthermore, the second drive voltage V2 of the second region 20 is higher than the first drive voltage V1 of the first region 10, making the second region 20 higher in reliability than the first region 10. Therefore, it can be expected that even if abnormality occurs in the first region 10, the second region 20 will operate normally.

Figure 2:
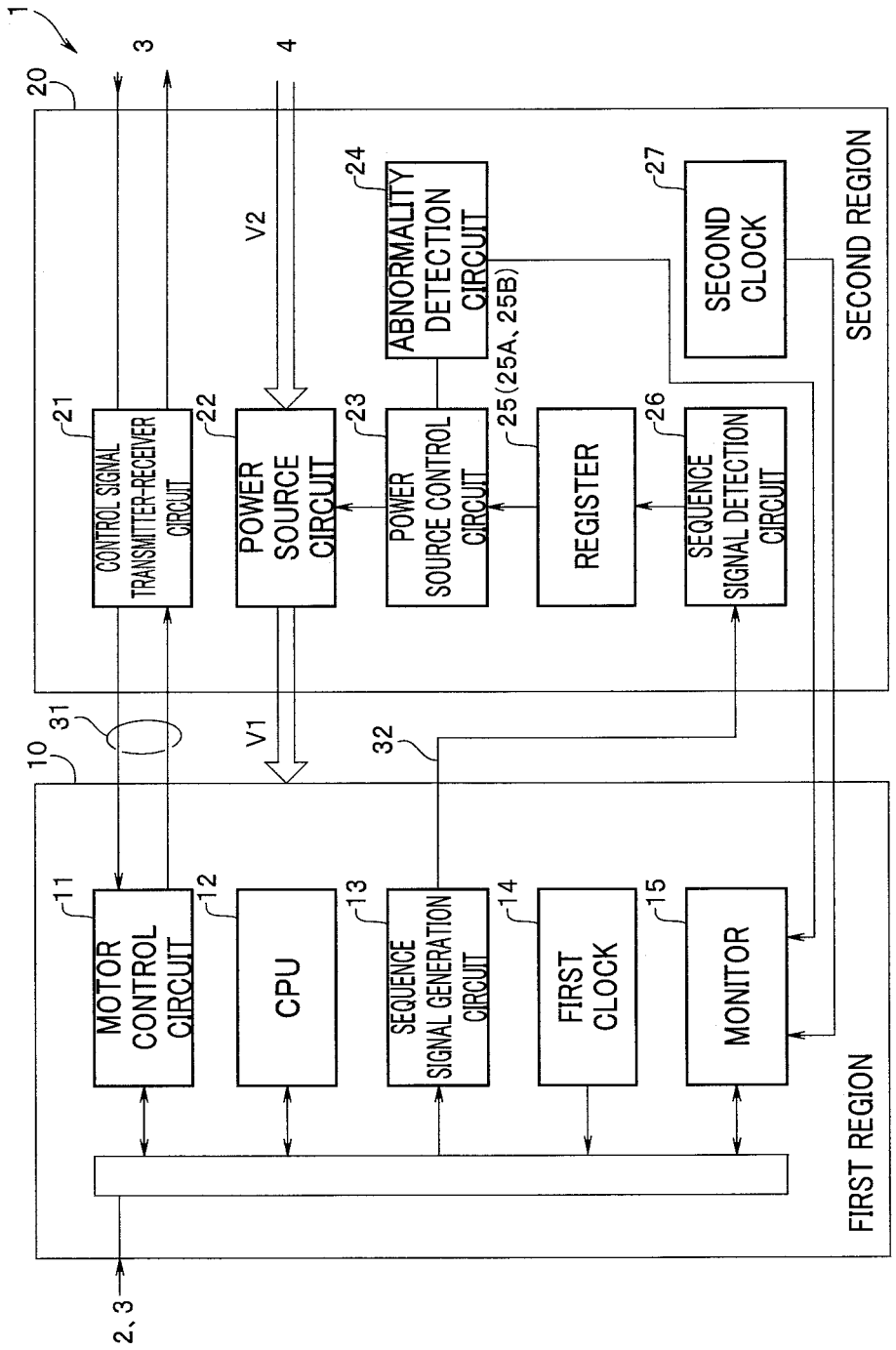
FIG. 2 is a configuration diagram of the control device according to the embodiment.

As shown in FIG. 2, the first region 10 includes a motor control circuit 11, a CPU 12, a sequence signal generation circuit 13, a first clock 14, a monitor 15, and a bus 16. The second region 20 includes a control signal transmitter-receiver circuit 21, a power source circuit 22, a power source/reset control circuit 23 (hereinafter also referred to as a "power source control circuit 23"), an abnormality detection circuit 24, a register 25, a sequence signal detection circuit 26, and a second clock 27.

Note that at least any of functional circuits such as the motor control circuit 11 of the control device 1 may be made up of an internal circuit of a software-based processor or may be made up of a dedicated hardware circuit.

The motor control circuit 11 in the first region 10 receives the feedback signal from the motor 3 or the operation signal from the operation member 2, and transmits and receives signals via the control signal transmitter-receiver circuit 21 in the second region 20 through a transmission path 31. The control signal transmitter-receiver circuit 21 transmits and receives signals from the motor control circuit 11 to/from the motor 3. The CPU 12 reads a program, for example, from a non-illustrated memory and performs overall control of the control device 1. The first clock 14 generates a signal at the first drive frequency F1.

The sequence signal generation circuit 13 converts a first signal that specifies a recovery method into a sequence signal containing a second signal, which is a digital signal of a predetermined pattern. More specifically, the sequence signal generation circuit 13 converts each piece of 1-bit data of the first signal into specific 3-bit data containing an inversion signal.

The control signal transmitter-receiver circuit 21 in the second region 20 transmits and receives control signals for use to control the motor 3. The power source circuit 22 is a DC/DC converter configured to convert power coming from the external power source 4 into drive power for the control device 1. For example, the power source circuit 22 converts power at the second drive voltage V2 into power at the first drive voltage V1 and supplies the resulting power to the first region 10. If power voltage from the power source 4 is not the second drive voltage V2, the power source circuit 22 converts the power voltage from the power source 4 into the second drive voltage V2. While controlling the entire second region 20, the power source control circuit 23 performs a recovery process for restoration of normal operation in case of occurrence of abnormality.

The register 25 includes a first register 25A and a second register 25B. The first register 25A stores control data including multiple recovery methods. The second register 25B stores a set value for use to specify one recovery method from among the multiple recovery methods stored in the first register 25A. The abnormality detection circuit 24 detects any operation abnormality of the control device 1. The sequence signal detection circuit 26 receives a sequence signal from the sequence signal generation circuit 13 and changes a set value of the second register 25B. The second clock 27 generates a signal at the second drive frequency F2.

For example, multiple recovery methods are stored in the first register 25A on startup. Note that rather than being a storage circuit rewritable by software, the first register 25A may be a non-rewritable storage circuit hardwire-implemented by dedicated hardware. In other words, according to the present invention, the "register" means not only a typical register, but also a "memory" configured to store data. The first register 25A and the second register 25B may be separate storage circuits of different configurations.

In case of occurrence of abnormality, a recovery process is performed by a recovery method selected based on a setting of the second register 25B made before the occurrence of abnormality by a signal from the first region 10.

In other words, a set value in the second register 25B configured to store set values for use to select recovery methods is specified during normal operation, for example, by a sequence signal from the first region 10 on startup. The sequence signal contains a second signal, which is obtained by converting a first signal that specifies a recovery method into a digital signal of a predetermined pattern.

If a stuck failure occurs on a transmission path 32 between the first region 10 and the second region 20, a wrong signal might be transmitted to the second region 20. However, unless the sequence signal detection circuit 26 receives a sequence signal containing a digital signal of a predetermined pattern, there is no chance that the set value in the second register 25B will be changed. Therefore, even if a wrong signal is transmitted to the sequence signal detection circuit 26 due to a stuck failure, there is no chance that the set value in the second register 25B will be changed.

A process of recovery from abnormality detected by the abnormality detection circuit 24 is performed by the power source control circuit 23 in the second region 20. All data (multiple methods of recovery processes and specification of a recovery process to be selected) needed for the recovery process are stored in the second region 20 higher in reliability than the first region 10 in advance before the occurrence of abnormality. In other words, the first region 10 having low reliability is not involved in the recovery process. Then, even if a stuck failure occurs on a transmission path of a signal selecting the recovery process, there is no chance that the method of recovery process will be changed erroneously.

Therefore, the control device 1 has high reliability.

An operation method of the control device 1 will be described below in line with a flowchart of FIG. 3.

<Step S10> Startup

When the control device 1 is started up, first, for example, power at the second drive voltage V2 is supplied to the second region 20. The power source circuit 22 converts the power at the second drive voltage V2 into power at the first drive voltage V1 and supplies the resulting power to the first region 10.

The CPU 12 starts up by reading setting data stored in a non-illustrated memory. In so doing, multiple recovery methods are also stored in the first register 25A in the second region 20. As described earlier, the first register 25A may be a non-volatile memory and store multiple recovery methods before the startup of the control device 1.

The multiple recovery methods are, for example, the following four methods: (A) do nothing, (B) give an instruction to reset the first region 10, (C) shut down power supply to the first region 10 and then start power supply again, and (D) shut down power supply to the first region 10, start power supply again, and then give an instruction to reset the second region 20. The recovery methods are stored in the first register 25A in the second region 20 having high reliability.

<Step S20> Generate Sequence Signal

Furthermore, the CPU 12 selects any of (A) to (D), for example, according to user settings and transmits the first signal to the sequence signal generation circuit 13. The sequence signal generation circuit 13 converts the first signal into the second signal.

For example, if the control device 1 is assumed to be used in an environment prone to power source abnormality, the CPU 12 selects (C), and if the control device 1 is assumed to be used in an environment prone to temperature abnormality, the CPU 12 selects (D).

In other words, upon receiving the first signal, the sequence signal generation circuit 13 converts the first signal into a sequence signal to be transmitted to the second region 20 through the transmission path 32. The transmission path 32 is a single signal line. The sequence signal contains the second signal, which is a digital signal of a predetermined pattern. The second signal is a 3-bit or longer digital signal including an inverted bit. Description will be given below by taking as an example a case in which the second signal is a (010) signal.

When 1-bit signals are input successively as the first signal from the CPU 12, the sequence signal generation circuit 13 converts each of the 1-bit signals into a 3-bit second signal and outputs the resulting 3-bit signals in sequence as a sequence signal.

<Step S30> Receive Sequence Signal
<Step S40> Set second register

Upon receiving a (010) signal, which is the second signal, the sequence signal detection circuit 26 inverts the bit of the second register 25B. For example, if the second register 25B is (0), the sequence signal detection circuit 26 transmits a signal intended to turn (0) to (1).

Regarding the setting of the second register 25B, each time a (010) signal is received, for example, the least significant bit is inverted and reconverted into the first signal specifying a recovery method. When any of the four recovery methods (A) to (D) is set according to user settings, it is sufficient if the second register 25B allows setting of 2-bit data. The number of bits that can be set on the second register 25B is set as appropriate according to the number of recovery methods.

<Step S50> Real Time Control

Based on a feedback signal and the like from the motor 3, the CPU 12 controls the motor 3 in real time such that the motor 3 will be driven under preset conditions.

<Step S60> Occurrence of Abnormality Detected 48

For example, if some of the circuits in the first region 10 go into overvoltage condition, the abnormality detection circuit 24 determines that abnormality has occurred (YES). For example, overvoltage condition occurs if a transmission line of the first drive voltage V1 and a transmission line of the second drive voltage V2 are short-circuited due to poor control caused by destruction or noise resulting from electrostatic discharge or the like, or if the power voltage from the power source 4 exceeds a maximum allowable voltage.

<Step S70> Select Process Based on Second Register

Based on the set value in the second register 25B, the power source control circuit 23 selects one recovery method from among the multiple recovery methods stored in the first register 25A.

<Step S80> Recovery Process

For example, if the setting of the second register 25B is (A) do nothing, the power source control circuit 23 continues controlling the motor 3 based on control information existing before the occurrence of abnormality. The recovery process is performed by the power source control circuit 23 using one of the multiple recovery methods stored in the first register 25A, based on the setting stored in the second register 25B. In other words, the recovery process is performed by components of the second region 20 having high reliability.

Then, in the control device 1, the first signal is converted into the second signal and the resulting second signal is transmitted to the second region 20. Consequently, even if a stuck failure occurs on the transmission path 32 of the sequence signal, there is no chance that a wrong signal will be recognized as the first signal. For example, even if a stuck failure occurs, causing a signal made up of successive (1) signals to be transmitted to the second region 20, the sequence signal detection circuit 26 does not regard the signal made up of successive (1) signals as the first signal. Therefore, operation method of the control device 1 does not cause a wrong recovery method to be performed due to erroneous transmission of a sequence signal, and thus has high reliability.

The data on the method of recovery process stored in the register 25 in the second region 20, which is higher in reliability than the first region 10, is unlikely to be damaged even if abnormality occurs in part of the first region 10. Note that the register 25 has been set not to get reset even if the first signal is an instruction to reset the second region 20. Note that if the first region 10 is to be reset, the cause of reset may be transmitted to the monitor 15 from the power source control circuit 23 before the reset.

The sequence signal generation circuit 13 may be built from hardware. However, if a stuck failure occurs with the sequence signal generation circuit 13 built from hardware, the sequence signal generation circuit 13 may end up outputting 3-bit signals such as (010) signals successively. Therefore, preferably the sequence signal generation circuit 13 generates the second signal using software.

To improve transmission reliability, preferably the second signal is 6 bits or longer, being made up of a 3-bit or longer pre-signal without including an inverted bit and a 3-bit or longer main signal following the pre-signal and including an inverted bit. For example, preferably the second signal is a 6-bit (000010) signal made up of a (000) pre-signal and a (010) main signal.

A second signal that includes the pre-signal and the main signal is higher in reliability than a second signal that includes only the main signal.

If a stuck failure occurs on the transmission path 32 of the sequence signal, the sequence signal containing the second signal is not transmitted to the sequence signal detection circuit 26, and thus state of the second register 25B is not updated. When the state of the second register 25B is not updated even if the first signal is transmitted, the CPU 12 performs a process prestored in the first register 25A to deal with the stuck failure. For example, the CPU 12 issues a warning notifying the user about the occurrence of the stuck failure or stops the motor 3 safely.

Note that the first region 10 and the second region 20 are driven at different drive frequencies. Therefore, to transmit and receive signals between the first region 10 and the second region 20, normally it is necessary that the first region 10 and the second region 20 operate synchronously with each other.

In other words, while the sequence signal detection circuit 26 in the second region 20 is receiving a signal from the first region 10, if a clock in the second region 20 is switched, the sequence signal detection circuit 26 cannot complete the reception of the signal. Therefore, a first clock signal of the first region 10 and a second clock signal of the second region 20 need to be controlled so as to start simultaneously.

However, using the fact that the second drive frequency F2 of the second region 20 is lower than the first drive frequency F1 of the first region 10, the synchronization process can be simplified. For example, if the second drive frequency F2 is ½₀ or below the first drive frequency F1, only if the sequence signal generation circuit 13 in the first region 10 starts transmitting a first sequence signal based on the clock signal of the second region 20, the sequence signal detection circuit 26 in the second region 20 can operate regardless of the clock signal of the first region 10.

Synchronization based on such software control has the advantage of reducing scattering in the number of synchronization cycles that is unavoidable with synchronization based on hardware control. When the number of synchronization cycles scatters, success or failure of detection of the sequence signal changes accordingly, and thus software control is effective for synchronization in this respect as well.

Whereas the control device 1 has been described above as being an MCD configured to control the motor 3, the control device 1 according to the present embodiment may be a driver configured to control various types of external circuits in real time.

Major reasons why the second region 20 is higher in reliability than the first region 10 are not limited to drive frequency and drive voltage. In other words, the second region 20 may be equal in drive frequency or drive voltage to the first region 10.

Whereas an embodiment of the present invention has been described, the embodiment is presented only by way of example, and not intended to limit the scope of the invention. The novel embodiment can be implemented in various other forms, and various omissions, replacements, and changes can be made without departing from the gist of the invention. Such an embodiment and modifications of the embodiment are included in the scope of the invention and the gist of the invention as well as in the invention set forth in the claims and the scope of equivalents of the invention.

What is claimed is:

1. A control device comprising:
a first region including a CPU and a sequence signal generation circuit; and
a second region including an abnormality detection circuit, a sequence signal detection circuit, a first register storing multiple methods of recovery from occurrence of abnormality, and a second register for use to select one method of recovery from the multiple methods of recovery, the second region being higher in reliability than the first region,
wherein the sequence signal generation circuit converts a first signal that specifies the one method of recovery into a sequence signal containing a second signal, the second signal being a digital signal of a predetermined pattern, and
the sequence signal detection circuit changes a set value of the second register upon receiving the second signal.

2. The control device according to claim 1, wherein the second signal is 3 bits or longer including an inverted bit.

3. The control device according to claim 2, wherein the second signal is 6 bits or longer.

4. The control device according to claim 1, wherein the second signal is made up of a pre-signal and a main signal following the pre-signal, the pre-signal having 3 or more bits and not including an inverted bit, and the main signal having 3 or more bits and including an inverted bit.

5. The control device according to claim 1, wherein the sequence signal generation circuit generates the second signal using software.

6. The control device according to claim 1, wherein a drive voltage of the second region is higher than a drive voltage of the first region.

7. The control device according to claim 1, wherein a second drive frequency of the second region is lower than a first drive frequency of the first region.

8. The control device according to claim 7, wherein:
the second drive frequency is $1/20$ of the first drive frequency or less;
a clock signal of the second region is transmitted to the first region; and
the sequence signal generation circuit starts transmitting the sequence signal in synchronization with the clock signal of the second region.

9. A method for operating a control device wherein:
the control device includes a first region, and a second region higher in reliability than the first region;
a first register in the second region stores multiple methods of recovery from occurrence of abnormality;
a sequence signal generation circuit in the first region converts a first signal that specifies a method of recovery from occurrence of abnormality into a sequence signal containing a second signal, is the second signal being a digital signal of a predetermined pattern; and
a sequence signal detection circuit in the second region changes a set value of a second register that specifies one method of recovery to be selected from the multiple methods of recovery, upon receiving the second signal.

* * * * *